N. EAMES.
Clover Huller.
No. 24,447.
Patented June 21, 1859.
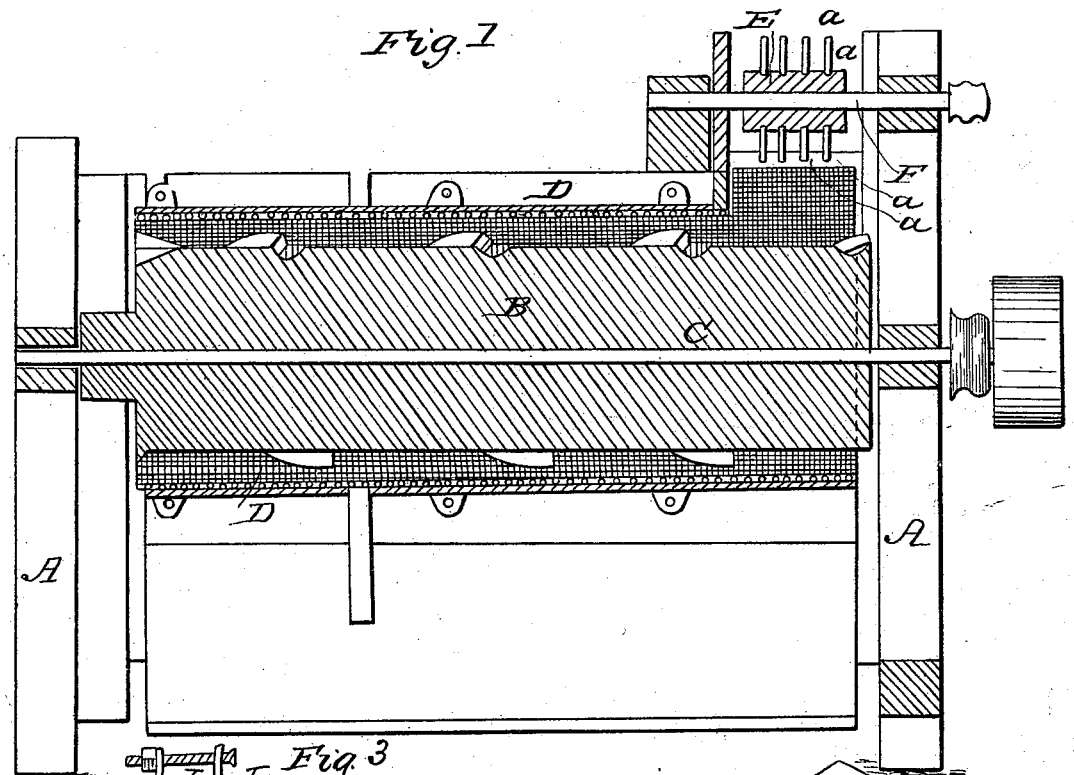
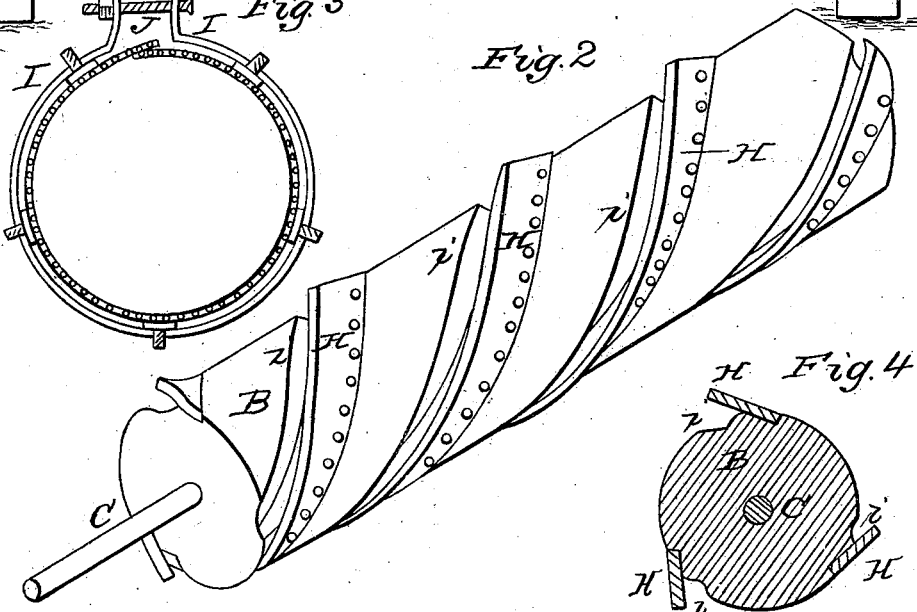
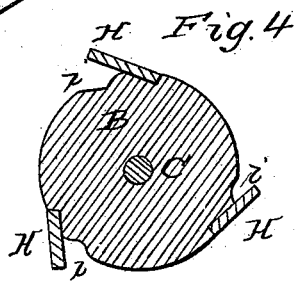
WITNESSES
C. M. Alexander
A. A. Leatman
INVENTOR
Nathaniel Eames

UNITED STATES PATENT OFFICE.

NATHANIEL EAMES, OF HANOVER, PENNSYLVANIA.

MACHINE FOR HULLING CLOVER.

Specification of Letters Patent No. 24,447, dated June 21, 1859.

*To all whom it may concern:*

Be it known that I, NATHANIEL EAMES, of Hanover, in the county of York and State of Pennsylvania, have invented a new and Improved Machine for Hulling Clover-Seed; and I do hereby declare that the following is a full and exact description thereof, reference being had to the accompanying drawings and to the letters of reference marked thereon.

The nature of my invention consists in the construction and arrangement of those parts of a clover huller which will be hereinafter particularly described.

In the annexed drawings Figure 1 represents a longitudinal vertical section. Fig. 2 is a perspective view of the cylinder and rubber attached. Fig. 3 is an end view of the screen. Fig. 4 is an end view of the cylinder.

In the several figures A represents a frame or chest in which the operating parts of the machine are secured.

B represents a cylinder constructed of any suitable material, which is secured to a shaft C, said shaft passing through the center of the cylinder. This shaft C, has its bearings in the ends of the chest A, and extends from one head of said chest to the other. This cylinder is surrounded with a band or strip of india rubber from one end to the other, said rubber being secured on in a spiral form as is shown in Fig. 2. A spiral groove is made in the cylinder as is seen and represented by *i, i, i.* One edge of the rubber strip is secured to the cylinder as shown in Fig. 2, in such proximity to the spiral groove that when that edge of the rubber strip which is loose is bent down it enters the groove, so as to be on a plane with the periphery of the cylinder.

The manner of securing the rubber to the cylinder is shown in Fig. 4, the edge of the rubber which is secured down lying in a groove just the depth of the thickness of the rubber strip.

D, represents a wire screen which is secured in the chest—said screen being larger than, and surrounding the cylinder.

E, represents a small cylinder which is secured on a small shaft F, said cylinder E being provided with teeth or short arms *a, a*. There are two of these cylinders (E) which are provided with teeth and which revolve together for the purpose of feeding the clover into the machine. The wire screen is bent around and its ends interlap as shown in Fig. 3, a band I, passes around the screen, and its two ends being secured together by a screw J the screen is held so that it cannot open, but is held in a circular form.

In operating this machine the clover heads are fed into the machine by means of the cylinders E, E, they fall down to cylinder B, and are carried into the screen D, and as the cylinder revolves rapidly the clover heads are pressed against the screen by means of the spiral strip of rubber and the heads are thus rubbed to pieces and the seed falls out and passes down into the bottom of the chest and through an aperture in it to vessels for receiving it.

A fan is used in connection with this machine to blow through the screen and carry away the chaff.

The groove in the cylinder under the loose edge of the rubber is indispensable to prevent the dust from collecting under said strip of rubber. The end of the rubber constantly working in and out of the groove works the dust and dirt out, and thus prevents its collecting.

Having thus fully described my invention what I claim as new and desire to secure by Letters Patent is—

The combination of the screen D, with the cylinder B when said cylinder is provided with a spiral groove *i, i*, and a spiral strip of rubber H, the same being constructed, arranged and operating substantially in the manner and for the purpose herein specified.

NATHANIEL EAMES.

Witnesses:
R. N. C. KIM,
S. E. SHAEFFER.